United States Patent
Nishiyama

(10) Patent No.: US 8,227,935 B2
(45) Date of Patent: Jul. 24, 2012

(54) HYBRID POWER SUPPLY DEVICE

(75) Inventor: Noriyuki Nishiyama, Niihama (JP)

(73) Assignee: Sumitomo Heavy Industries Engineering & Services Co., Ltd., Tokyo (JP)

( * ) Notice: Subject to any disclaimer, the term of this patent is extended or adjusted under 35 U.S.C. 154(b) by 259 days.

(21) Appl. No.: 12/666,494

(22) PCT Filed: Apr. 15, 2008

(86) PCT No.: PCT/JP2008/057313
§ 371 (c)(1),
(2), (4) Date: Dec. 23, 2009

(87) PCT Pub. No.: WO2009/001604
PCT Pub. Date: Dec. 31, 2008

(65) Prior Publication Data
US 2010/0156180 A1    Jun. 24, 2010

(30) Foreign Application Priority Data
Jun. 26, 2007    (JP) .................................. 2007-167467

(51) Int. Cl.
*H02J 3/32*    (2006.01)
(52) U.S. Cl. ................. 307/46; 701/22; 363/79
(58) Field of Classification Search .............. 307/46, 307/10.1, 24
See application file for complete search history.

(56) References Cited

U.S. PATENT DOCUMENTS

| | | | | |
|---|---|---|---|---|
| 7,000,601 B2 * | 2/2006 | Yasui et al. | | 123/561 |
| 2004/0148817 A1 * | 8/2004 | Kagoshima et al. | | 37/348 |
| 2009/0171521 A1 * | 7/2009 | Moki et al. | | 701/22 |
| 2009/0315396 A1 * | 12/2009 | Ichikawa et al. | | 307/24 |

FOREIGN PATENT DOCUMENTS

| | | | |
|---|---|---|---|
| JP | 2-74420 | | 3/1990 |
| JP | 5-98983 | | 4/1993 |
| JP | 11-217193 | | 8/1999 |
| JP | 11-285165 | | 10/1999 |
| JP | 2002-325379 | | 11/2002 |
| JP | 2003-102106 | | 4/2003 |
| JP | 2004-56937 | | 2/2004 |
| JP | 2004056937 | * | 2/2004 |
| JP | 2006-238516 | | 9/2006 |
| JP | 2006238516 | * | 9/2006 |

* cited by examiner

Primary Examiner — Rexford Barnie
Assistant Examiner — Toan Vu
(74) Attorney, Agent, or Firm — Squire Sanders (US) LLP

(57) ABSTRACT

To provide a hybrid power supply device capable of properly controlling an operation of an engine generator and also preventing the device from increasing in size.

The power supply device including an engine generator 11 and a capacitor 15 comprises: a DC bus La having the engine generator 11 and the capacitor 15 connected in parallel and supplying electric power to an outside; a step-up converter 13 provided between the DC bus La and the engine generator 11; and a control section 17 controlling the step-up converter 13 and regulating electric power supplied from the engine generator 11 to the DC bus La. Since both of the engine generator 11 and the capacitor 15 can supply electric power to the outside, the engine generator 11 can be downsized. If the control section 17 controls the step-up converter 13, the electric power supplied from the engine generator 11 to the DC bus La can be regulated, and therefore, a load variation of the engine generator 11 can be suppressed to a variation of electric power supplied from the power supply device to the outside.

8 Claims, 2 Drawing Sheets

F I G. 1
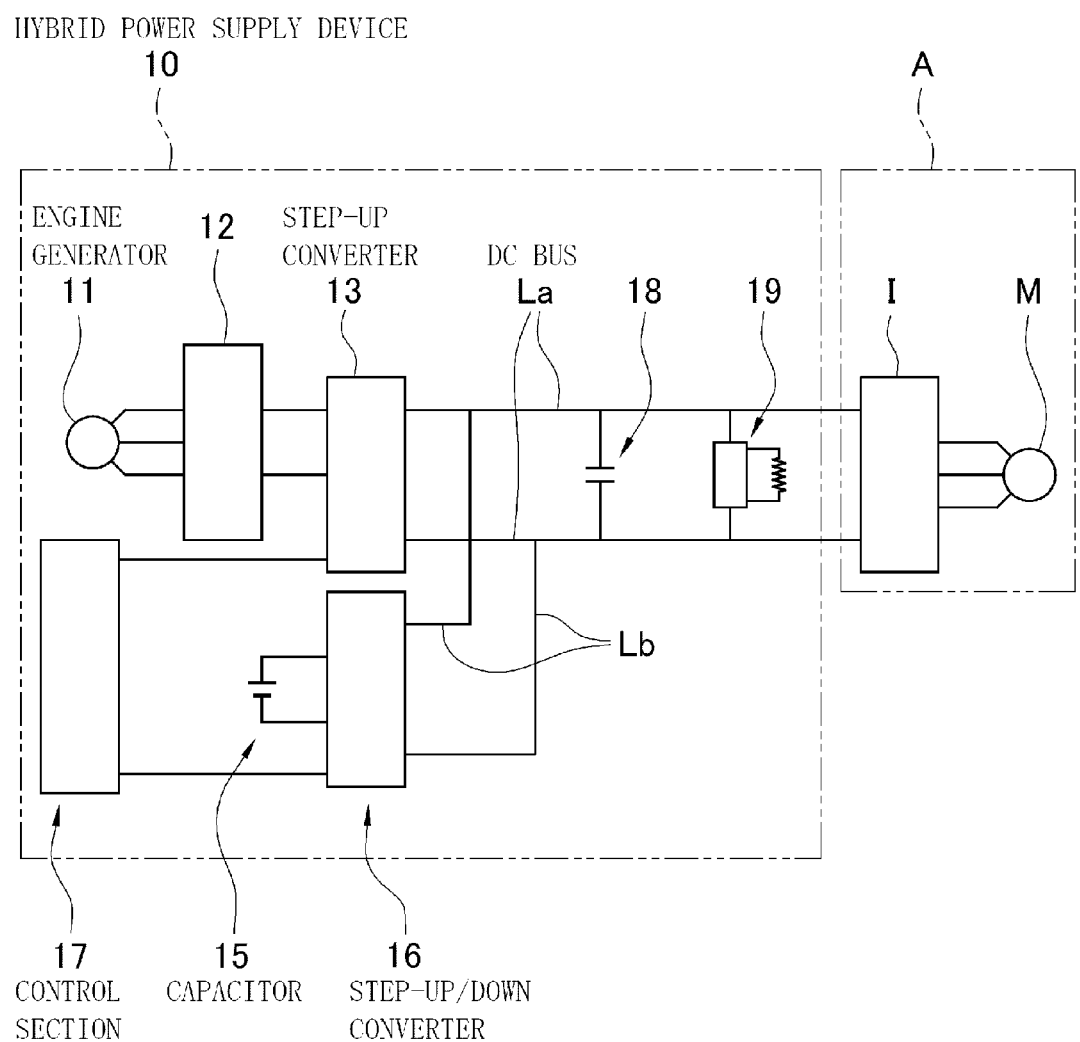

HYBRID POWER SUPPLY DEVICE

TECHNICAL FIELD

The present invention relates to a hybrid power supply device. A device including a mechanism driving a motor or the like by a hybrid power supply including an engine generator and a capacitor such as a battery is developed for cranes or the like having engine generators as a power source such as gantry cranes or tire-mounted jib cranes.

The present invention relates to a hybrid power supply device used for equipment of the gantry crane or the like.

BACKGROUND ART

Engine generators including diesel engines or the like are conventionally used for a power source driving an electric motor such as a motor or a pump in cranes or the like. The engine generator supplies generated electric power to the electric motor through a converter and an inverter in the crane or the like. A capacitor such as a battery is also provided on a circuit supplying electric power to the electric motor in parallel with the inverter (for example, Patent Documents 1 and 2).

In techniques of Patent Documents 1 and 2, energy efficiency can be increased because surplus power can be stored in the capacitor when an electric motor requires a small amount of electric power. Then, both of the engine generator and the capacitor can supply electric power to the electric motor when the electric motor requires a large amount of electric power. Because of this, there is an advantage that the engine generator can be downsized.

However, a load applied to the engine generator varies in proportion to the electric power required by the electric motor in the techniques of Patent Documents 1 and 2. Because of this, the load applied to the engine generator significantly increases if the electric power required by the electric motor significantly increases, so that there is a possibility that a momentary voltage of the engine generator drops. The engine generator may stop in extreme cases.

As a technique solving the above problem, a technique is also developed in which all of the electric power generated by the engine generator is supplied to a battery and the electric power is supplied to a motor or the like only by the battery (Patent Document 3).

In the technique of Patent Document 3, since the engine generator is only used for charging the battery, the engine generator can be operated in an optimal condition regardless of electric power required by the electric motor. Because of this, there is an advantage of being able to improve fuel consumption.

In the case of the technique of Patent Document 3, a load of the engine generator does not vary if the electric power required by the motor varies because the electric power is only supplied from the battery. However, there is a problem that a power supply device increases in size because a large battery is required for certainly supplying the electric power required by the motor.

Patent Document 1
   Japanese Patent Laid-Open No. 11-217193
Patent Document 2
   Japanese Patent Laid-Open No. 11-285165
Patent Document 3
   Japanese Patent Laid-Open No. 2003-102106

DISCLOSURE OF THE INVENTION

Problems to be Solved by the Invention

In view of the above circumstances, an object of the present invention is to provide a hybrid power supply device capable of properly controlling an operation of an engine generator and preventing an increase in size of the device.

Means for Solving the Problems

A hybrid power supply device according to a first feature of the present invention is a power supply device comprising an engine generator and a capacitor, wherein the device comprises: a DC bus having the engine generator and the capacitor connected in parallel and supplying electric power to an outside; a step-up converter provided between the DC bus and the engine generator and controlling a current amount supplied from the engine generator to the DC bus; a step-up/down converter provided between the DC bus and the capacitor and controlling a current amount supplied from the capacitor to the DC bus; and a control section controlling an operation of the step-up/down converter and the step-up converter, and the control section controls the step-up/down converter so that a voltage of the DC bus is higher than an output voltage of the engine generator.

A hybrid power supply device according to a second feature of the present invention is the first feature of the present invention, wherein the control section controls the step-up converter so as to supply a part of a current amount supplied to the outside from the engine generator to the DC bus and controls the step-up/down converter so as to maintain the voltage of the DC bus at a predetermined set voltage.

A hybrid power supply device according to a third feature of the present invention is the first or second feature of the present invention, wherein the control section determines the current amount supplied from the engine generator to the DC bus based on the current amount supplied to the outside and an amount of charge of the capacitor.

A hybrid power supply device according to a fourth feature of the present invention is the first, second or third feature of the present invention, wherein an electrolytic capacitor is connected to the DC bus in parallel with the engine generator and the capacitor.

A hybrid power supply device according to a fifth feature of the present invention is the first, second, third, or fourth feature of the present invention, wherein the engine generator has a supercharging mechanism, and the control section controls an increase rate of a current amount supplied from the engine generator to the voltage of the DC bus so that an increase rate of a current amount after exceeding a maximum current amount obtained at the time of a non-supercharging maximum power output in which the supercharging mechanism is not used in the engine generator is smaller than an increase rate of a current amount up to the maximum current amount obtained at the time of the non-supercharging maximum power output when the current amount supplied to the outside increases.

A control method for a hybrid power supply device according to a sixth feature of the present invention is a control method for a power supply device comprising an engine generator and a capacitor, wherein the device comprises: a DC bus having the engine generator and the capacitor connected in parallel and supplying electric power to an outside; a step-up converter provided between the DC bus and the engine generator and controlling a current amount supplied from the engine generator to the DC bus; a step-up/down converter provided between the DC bus and the capacitor and controlling a current amount supplied from the capacitor to the DC bus; and a control section controlling an operation of the step-up/down converter and the step-up converter, and the method comprises the step of: controlling the step-up/down converter by the control section so that a voltage of the DC bus is higher than an output voltage of the engine generator.

A control method for a hybrid power supply device according to a seventh feature of the present invention is the sixth feature of the present invention, wherein the method comprises the steps of: controlling the step-up converter so as to supply a part of a current amount supplied to the outside from the engine generator to the DC bus; and controlling the step-up/down converter so as to maintain the voltage of the DC bus at a predetermined set voltage.

A control method for a hybrid power supply device according to a eighth feature of the present invention is the sixth or seventh feature of the present invention, wherein the method comprises the step of: determining the current amount supplied from the engine generator to the DC bus based on the current amount supplied to the outside and an amount of charge of the capacitor.

A control method for a hybrid power supply device according to a ninth feature of the present invention is the sixth, seventh or eighth feature of the present invention, wherein the engine generator has a supercharging mechanism, and the method comprises the step of: controlling an increase rate of a current amount supplied from the engine generator to the voltage of the DC bus so that an increase rate of a current amount after exceeding a maximum current amount obtained at the time of a non-supercharging maximum power output in which the supercharging mechanism is not used in the engine generator is smaller than an increase rate of a current amount up to the maximum current amount obtained at the time of the non-supercharging maximum power output when the current amount supplied to the outside increases.

Advantages of the Invention

According to the first feature of the present invention, the engine generator and the capacitor are connected to the DC bus in parallel, both of which can supply electric power to the outside, and therefore, both of the engine generator and the capacitor can be downsized. Moreover, electric power supplied from the engine generator to the DC bus can be regulated because the control section controls the step-up converter. Accordingly, a load of the engine generator can be regulated regardless of a variation of the electric power supplied from the power supply device to the outside. Then, the control section performs control so that a voltage of the DC bus is higher than an output voltage of the engine generator, thereby preventing a current supplied from the engine generator to the DC bus from being in a non-control state. Because of this, controlling the step-up converter allows a load variation of the engine generator to be always actively controlled and suppressed within a set load regulation.

According to the second feature of the present invention, restriction of a current supplied from the engine generator allows electric power supplied from the engine generator (a load of the engine generator) to be controlled with accuracy enough to be practical because the output voltage of the engine generator is comparatively stable. Additionally, a current supplied from the capacitor is controlled so as to maintain the voltage of the DC bus, thereby being able to supply from the capacitor a difference between the electric power supplied to the outside and the electric power supplied from the engine generator. Accordingly, control becomes easier compared with a case of controlling the electric power supplied from the engine generator and the electric power supplied from the capacitor.

According to the third feature of the present invention, since electric power borne by the engine generator is determined considering an amount of charge of the capacitor, the amount of charge of the capacitor can be properly maintained and an over-discharge state can be prevented.

According to the fourth feature of the present invention, since electric power stored in the electrolytic capacitor functions as a buffer, it is possible to automatically ease a load variation of the engine generator when electric power supplied from the power supply device to the outside significantly varies, and suppress the load variation within the set load regulation.

According to the fifth feature of the present invention, since a load of the engine generator does not become excessively large at the time of a variation of a supply current amount, generation of black smoke and a stop of the engine generator can be prevented.

According to the sixth feature of the present invention, the engine generator and the capacitor are connected to the DC bus in parallel, both of which can supply electric power to the outside, and therefore, both of the engine generator and the capacitor can be downsized. Moreover, electric power supplied from the engine generator to the DC bus can be regulated because the control section controls the step-up converter. Accordingly, the load of the engine generator can be regulated regardless of a variation of the electric power supplied from the power supply device to the outside. Then, the control is performed in which the voltage of the DC bus is higher than the output voltage of the engine generator, thereby preventing a current supplied from the engine generator to the DC bus from being in a non-control state. Because of this, controlling the step-up converter allows the load variation of the engine generator to be always actively controlled and suppressed within the set load regulation.

According to the seventh feature of the present invention, restriction of the current supplied from the engine generator allows the electric power supplied from the engine generator (the load of the engine generator) to be controlled with accuracy enough to be practical because the output voltage of the engine generator is comparatively stable. Additionally, the current supplied from the capacitor is controlled so as to maintain the voltage of the DC bus, thereby being able to supply from the capacitor a difference between the electric power supplied to the outside and the electric power supplied from the engine generator. Accordingly, control becomes easier compared with the case of controlling the electric power supplied from the engine generator and the electric power supplied from the capacitor.

According to the eighth feature of the present invention, since the electric power borne by the engine generator is determined considering the amount of charge of the capacitor, the amount of charge of the capacitor can be properly maintained and an over-discharge state can be prevented.

According to the ninth feature of the present invention, since the load of the engine generator does not become excessively large at the time of the variation of the supply current amount, generation of black smoke and a stop of the engine generator can be prevented.

BEST MODE FOR CARRYING OUT THE INVENTION

Next, an embodiment of the present invention is described based on drawings.

A hybrid power supply device of the present invention is a device for supplying electric power to a working actuator such as a winch or a cross traveling device in a machine such as a rubber-tired gantry crane or a tire-mounted jib crane, wherein the device comprises an engine generator and a capacitor, an operation of the engine generator can be properly controlled, and the device can be prevented from increasing in size.

FIG. 1 is a schematic circuit diagram of a hybrid power supply device 10 of the embodiment. Reference numeral 10 indicates a hybrid power supply device of the embodiment in the diagram. Additionally, reference character A indicates a working actuator to which electric power is supplied from the hybrid power supply device.

Hereinafter, an example is described in which the working actuator A has an electric motor M such as a motor and an inverter I, while the inverter I may be provided between the electric motor M and a DC bus La described below or may be included in the hybrid power supply device 10.

In FIG. 1, reference character La indicates a DC bus supplying DC power from the hybrid power supply device 10 of the embodiment to an outside. The DC bus La has a pair of conductive paths. An electrolytic capacitor 18 is provided between the pair of conductive paths. The electrolytic capacitor 18 can store DC power supplied to the DC bus La and also discharge to supply DC power to the DC bus La. Electric power stored in the electrolytic capacitor 18 functions as a buffer to a variation of electric power required by the working actuator A because the electrolytic capacitor 18 automatically performs a storage/discharge operation according to a relation between a charging rate thereof and a DC voltage of the DC bus La.

The inverter I and respective converters 13 and 16 described below generally include electrolytic capacitors connected in parallel with the DC bus La. Accordingly, the extra electrolytic capacitor 18 may not be provided if the electrolytic capacitor performs a function of the electrolytic capacitor 18.

As shown in FIG. 1, an engine generator 11 of the hybrid power supply device 10 of the embodiment is connected to the DC bus La through a diode converter 12 and a step-up converter 13.

The engine generator 11 is an engine generator generating AC power and has an automatic voltage regulator (AVR), and a variation of an output voltage thereof is small. The diode converter 12 converts AC power generated by the engine generator 11 to DC power and can supply it to the step-up converter 13.

While the engine generator 11 can employ a diesel generator or the like having a supercharging mechanism such as a turbocharger, it is not particularly limited thereto if it is an engine generator generating AC power.

Further, a device converting the AC power generated by the engine generator to DC power for an output is not limited to a diode converter.

The DC power converted by the diode converter 12 is supplied to the DC bus La through the step-up converter 13.

The step-up converter 13 has a function that boosts a voltage of the DC power converted by the diode converter 12 (hereinafter, an engine-side voltage) for an output, and operates based on an instruction from a control section 17. Specifically, the step-up converter 13 controls a current amount supplied from the diode converter 12 to the DC bus La based on the instruction from the control section 17. A DC power amount supplied to the DC bus La, and a period and timing for supplying the DC power are regulated by controlling the current amount.

Because of this, if the step-up converter 13 is controlled, DC power with a higher voltage than the engine-side voltage can be supplied to the DC bus La during a desired period at desired timing, that is, by a desired amount at the desired timing.

Additionally, as shown in FIG. 1, a device such as a battery or a capacitor capable of charging and discharging (hereinafter, capacitor 15) is connected to the DC bus La in parallel with the engine generator 11 through a step-up/down converter 16. Accordingly, the capacitor 15 can also supply electric power to the working actuator A through the step-up/down converter 16 and the DC bus La.

The step-up/down converter 16 has a function that boosts a voltage of DC power supplied from the capacitor 15 (hereinafter, a capacitor-side voltage) for an output and lowers the voltage, and operates based on an instruction from the control section 17 similarly to the step-up converter 13. Specifically, the step-up/down converter 16 controls a current amount supplied from the capacitor 15 to the DC bus La by step-up control based on the instruction from the control section 17. A DC current supplied to the DC bus La is regulated so as not to reduce a voltage of the DC bus La (a voltage between terminals of the electrolytic capacitor 18) by controlling the current amount.

The step-up/down converter 16 also has a function that supplies a DC current from the DC bus La to the capacitor 15 so as not to increase the voltage of the DC bus La by step-down control.

Because of this, if the step-up/down converter 16 is boost controlled, DC power with a higher voltage than the capacitor-side voltage can be supplied to the DC bus La during a desired period at desired timing, that is, by a desired amount at the desired timing. Accordingly, the DC bus La can be maintained at a predetermined set voltage.

The step-up/down converter 16 also has a function that performs the step-down control to output a voltage slightly higher than the capacitor-side voltage lower than the voltage of the DC bus La to a side of the capacitor 15 and supply DC power to the capacitor 15. Accordingly, in the case where a charging rate of the capacitor 15 is reduced or the voltage of the DC bus La is much higher than the predetermined set voltage, it is possible to charge the capacitor 15 by supplying a lowered DC power from the DC bus La to the capacitor 15.

Next, the control section 17 is described.

As described above, the control section 17 controls an operation of the step-up converter 13 and the step-up/down converter 16, and has a function regulating the electric power borne by the engine generator 11 and the capacitor 15. Voltage information of the DC bus La, current information to the inverter I of the working actuator A, information of an amount of charge of the capacitor 15, and the like are inputted to the control section 17. The electric power borne by the engine generator 11 and the capacitor 15 is regulated based on the information.

A method for determining DC power borne by the engine generator 11 and the capacitor 15 by the control section 17 is not particularly limited and the DC power can be determined based on information other than the above information.

According to the above configuration, the hybrid power supply device 10 of the embodiment can supply electric power from both of the engine generator 11 and the capacitor 15 to the working actuator A.

Thus, it is possible for the capacitor 15 to bear a shortfall of electric power even if electric power required by the working actuator A is larger than electric power that can be supplied from the engine generator 11 through the step-up converter 13. Conversely, it is possible for the engine generator 11 to bear a shortfall of electric power even if the electric power required by the working actuator A is larger than electric power that can be supplied from the capacitor 15 through the step-up/down converter 16.

That is, the working actuator A can be operated even by the engine generator 11 and capacitor 15 that can only supply electric power smaller than maximum electric power required by the working actuator A. Because of this, both of the engine generator 11 and the capacitor 15 can be downsized, so that the whole hybrid power supply device 10 can also be downsized.

Additionally, since the control section 17 can regulate DC power supplied from each of the engine generator 11 and the capacitor 15 to the DC bus La, it is possible to freely regulate a rate of the DC power borne by each of the engine generator 11 and the capacitor 15.

It is also possible to prevent that any one of loads of the engine generator 11 and the capacitor 15 becomes too large.

Moreover, even in the case where the electric power required by the working actuator A, or the electric power supplied from the hybrid power supply device 10 of the embodiment to the working actuator A significantly varies, a significant variation of the load of the engine generator 11 can be suppressed if a side of the capacitor 15 is controlled so as to temporarily bear more electric power. As a result, generation of black smoke and an urgent stop of the engine generator can be prevented.

Since the control section 17 determines the electric power borne by the engine generator 11 considering an amount of charge of the capacitor 15, the amount of charge of the capacitor 15 can be properly maintained and over-discharge of the capacitor 15 can be prevented.

Further, in the hybrid power supply device 10 of the embodiment, the control section 17 controls the step-up/down converter 16 so that a voltage of the DC bus La is always higher than a voltage of DC power supplied from the diode converter 12 to the step-up converter 13.

Since the step-up converter 13 cannot make an output voltage lower than an input voltage, a current supplied to the DC bus La cannot be controlled by the step-up converter 13 when the voltage of the DC bus La is lower than the engine-side voltage. As a result, a current is supplied from the diode converter 12 to the DC bus La without limitation. That is, the step-up converter 13 cannot control the load of the engine generator 11 and the engine generator 11 is operated for supplying a current flowing without limitation. Then, the engine generator 11 is overloaded, so that black smoke may be generated and the engine generator 11 may stop in the worst case.

However, in the hybrid power supply device 10 of the embodiment, the control section 17 controls the step-up/down converter 16 so that the voltage of the DC bus La is always higher than the voltage of the DC power supplied from the diode converter 12 to the step-up converter 13, and therefore, it is possible to prevent the above problems. Then, a load variation of the engine generator 11 can be suppressed within a set load regulation because the load variation of the engine generator 11 can be always actively controlled by controlling the set-up converter 13.

The voltage of the DC bus La (the voltage between the terminals of the electrolytic capacitor 18) is always maintained to be higher than the engine-side voltage and the capacitor-side voltage. It is obvious that this voltage value is set to be higher than a maximum voltage that the engine generator 11 can supply and a maximum voltage that the capacitor 15 can supply.

Further, in the hybrid power supply device 10 of the embodiment, a supply current amount and the voltage of the DC bus La are detected instead of electric power used at the inverter I and the voltage of the DC bus La is only controlled so as to be maintained at a predetermined set voltage, thereby regulating an electric power balance. As a result, the control can be performed easily.

Generally, in the case of supplying electric power from the engine generator 11 and the capacitor 15 to the inverter I, total electric power of the electric power supplied by the engine generator 11 and the electric power supplied by the capacitor 15 must be consistent with electric power of the inverter I. Because of this, in the conventional technique, electric power used at the inverter I has been detected, and an output voltage and an output current of each of the engine generator 11 and the capacitor 15 have been controlled based on the electric power used at the inverter I. Then, control has been performed in which the total electric power of the engine generator 11 and the capacitor 15 is consistent with the electric power use at the inverter I. Accordingly, in the conventional technique, a power supply device has been controlled based on an idea of directly detecting and controlling electric power, and therefore, control for regulating the electric power balance has been very complicated.

However, the electric power balance can be easily regulated in the hybrid power supply device 10 of the embodiment because of following reasons.

Initially, since an output voltage of the engine generator 11 is comparatively stable, the control section 17 only regulates a current amount supplied from the engine generator 11 to the DC bus La based on a supply current amount by controlling the step-up converter 13, so that the control section 17 can control electric power supplied from the engine generator 11 to the DC bus La. Accordingly, the control section 17 can control the electric power supplied from the engine generator 11 to the DC bus La (a load of the engine generator) with accuracy enough to be practical only by the current amount.

Meanwhile, the engine generator 11 only bears a part of the electric power used at the inverter I, and therefore, it is necessary to supply electric power from the capacitor 15 to the inverter I and the DC bus La by a difference between the electric power used at the inverter I and the electric power supplied from the engine generator 11.

If the voltage of the DC bus La is fixed, electric power supplied from the hybrid power supply device 10 can be consistent with the electric power used at the inverter I by supplying a current from the capacitor 15 by a difference between a supply current amount and a current amount supplied from the engine generator 11 to the DC bus La. That is, if the control section 17 controls the step-up/down converter 16 and supplies the current amount from the capacitor 15 to the DC bus La so that the voltage of the DC bus La is fixed, the electric power supplied from the hybrid power supply device 10 can be consistent with the electric power used at the inverter I.

As described above, in the hybrid power supply device 10 of the embodiment, it is not necessary to consider the total electric power of the engine generator 11 and the capacitor 15 and the electric power used at the inverter I. Additionally, the electric power balance can be regulated simply by regulating the current amount supplied from the engine generator 11 to the DC bus La based on the supply current amount, and regulating the current amount supplied from the capacitor 15 to the DC bus La so as to maintain the voltage of the DC bus La at a set voltage. As a result, the control can be performed easily.

Next, an operation of the hybrid power supply device 10 of the embodiment is described.

Hereinafter, described are (1) the case where the electric motor M of the working actuator A is on standby, (2) the case where the electric motor M of the working actuator A is in a power running state, and (3) the case where the electric motor M of the working actuator A performs a regenerative operation.

(1) The Case where the Electric Motor M of the Working Actuator A is on Standby

An electric power supply from the engine generator 11 and the capacitor 15 to the DC bus La is stopped when the electric motor M of the working actuator A is on standby, that is, the inverter I does not operate the electric motor M.

The electrolytic capacitor 18 supplies electric power to the inverter I of the working actuator A even in this state, and a voltage of the electrolytic capacitor 18 gradually drops due to a current flowing through a discharge resistor of an electrolytic capacitor (not shown) in the inverter I. As the voltage of the electrolytic capacitor 18 drops, the voltage of the DC bus La also drops.

Since the control section 17 measures the voltage of the DC bus La, the control section 17 operates the step-up/down converter 16 and supplies electric power from the capacitor 15 to the DC bus La so that the voltage of the DC bus La is at a set value. Specifically, a gate open time of a step-up side transistor in the step-up/down converter 16 is controlled to regulate the electric power supplies to the DC bus La and the voltage of the DC bus La is stably at the set value.

(2) The Case where the Electric Motor M of the Working Actuator A is in a Power Running State When the electric motor M of the working actuator A is in a power running state, a current amount required by the working actuator A cannot be satisfied by supply electric power (a supply current) from the engine generator 11 and the capacitor 15 if a current amount supplied to the working actuator A increases. Because of this, a shortage of the current amount is made up for by a discharge from the electrolytic capacitor 18.

Meanwhile, the control section 17 detects a current amount flowing to the inverter I (an inverter-side current amount). Electric power supplied from the engine generator 11 to the DC bus La, that is, a current amount supplied from the engine generator 11 to the DC bus La is determined based on a variation of the inverter-side current amount.

In the case where an amount of charge of the capacitor 15 is small, a load of the engine generator 11 is determined so that electric power borne by the capacitor 15 is suppressed and a charge to the capacitor 15 can be performed.

When the current amount supplied from the engine generator 11 to the DC bus La is determined, an instruction is transmitted from the control section 17 to the step-up converter 13 and a current is supplied from the engine generator 11 to the DC bus La by the determined current amount. Specifically, a predetermined current is supplied to the DC bus La by controlling a gate open time of the set-up side transistor in the step-up converter 13. An output, or a load of the engine generator 11 varies depending on the current amount supplied to the DC bus La.

Here, the electric power supplied from the engine generator 11 to the DC bus La is a part (for example, about a half) of electric power required for operating the electric motor M. Because of this, the electrolytic capacitor 18 keeps discharging, a voltage between the terminals of the electrolytic capacitor 18 drops, and a voltage of the DC bus La also drops.

When the voltage of the DC bus La drops, an instruction is transmitted from the control section 17 to the step-up/down converter 16 and DC power, or a current is supplied from the capacitor 15 to the DC bus La so that the voltage of the DC bus La is at a set value. Specifically, a predetermined current is supplied to the DC bus La by controlling the gate open time of the step-up side transistor in the step-up/down converter 16.

Accordingly, the capacitor 15 can supply a difference between the current amount supplied to the working actuator A and the current amount supplied from the engine generator 11, and further, it is also charged to the electrolytic capacitor 18, so that the voltage of the DC bus La can be maintained at the set value.

In the case where the engine generator 11 has a supercharging mechanism such as a turbocharger, in a state where the supercharging mechanism does not function (hereinafter, a non-supercharging state), an output of the engine generator 11, or a current amount obtained from the engine generator 11 is smaller than that of in a state where the supercharging mechanism functions (hereinafter, a supercharging state). Further, there is a time delay (hereinafter, a time lag) up to the supercharging state when a load of the engine generator 11 increases in the non-supercharging state.

In the case where a current amount required by the engine generator 11 significantly increases according to a significant increase of the current amount supplied to the working actuator A and when the current amount varies from not more than a maximum current amount obtained at the time of a maximum power output in the non-supercharging state to not less than the maximum current amount, there is a possibility that the load of the engine generator 11 exceeds the maximum power output in the non-supercharging state during the time lag. In this case, the engine generator 11 is overloaded, and black smoke can be generated and the engine generator 11 can stop in the worst case.

Thus, the hybrid power supply device 10 of the embodiment determines a variation state of electric power borne by the engine generator 11, that is, the current amount supplied from the engine generator 11 to the DC bus La as described below in the case where the current amount supplied to the working actuator A significantly increases.

FIG. 2 is a diagram showing the variation state of the current amount borne by the engine generator 11 in the case where the current amount supplied to the working actuator A significantly increases. In FIG. 2, a case is shown in which the current amount supplied from the engine generator 11 is smaller than a half of the current amount supplied from the hybrid power supply device 10 to the working actuator A at the time of a stable operation, however, obviously it is not limited to the case.

Initially, in FIG. 2, a solid line RP shows a current amount RP (hereinafter, simply referred as a supply current amount RP) supplied from the hybrid power supply device 10 to the working actuator A. A dashed line HP shows a current amount HP of a half of the supply current amount RP.

As shown in FIG. 2, when the supply current amount RP significantly increases in the non-supercharging state or a state where the engine generator 11 stops, a current amount supplied from the engine generator 11 to the DC bus La (hereinafter, an engine current amount EP) is controlled so as to increase along a line of the current amount HP.

When the engine current amount EP reaches a current amount C obtained at the time of a maximum power output in the non-supercharging state in the engine generator 11, a increase rate of the current amount EP is reduced. Then, the engine generator 11 becomes the supercharging state during reducing the increase rate of the current amount EP.

When the supply current amount RP is in a stable state, the engine current amount EP is controlled so as to be a current amount B with a bearing rate in a normal operation. While the current amount B is larger than the current amount C, the engine generator 11 can be operated in a stable state because the engine generator 11 is in the supercharging state at this time.

If control is preformed as described above, the load of the engine generator 11 does not become excessive even though the supply current amount RP significantly varies. Because of this, black smoke generation and a stop of the engine generator 11 can be prevented.

Further, tracking of the engine generator 11 to the variation of the supply current amount RP can be heightened to some extent, the amount of charge of the capacitor 15 can be properly maintained, and an over-discharge state can be prevented because the load of the engine generator 11 is significantly increased up to the current amount C obtained at the time of the maximum power output in the non-supercharging state.

In the case of increasing the engine current amount EP in the non-supercharging state or a stop state, the engine current amount EP is not necessarily varied along the line of the current amount HP that is a half of the supply current amount RP. The engine current amount EP may be moved along a line of a current amount not less than a half of the supply current amount RP or a line of a current amount not more than a half thereof depending on performance of the engine generator 11 or the capacitor 15.

(3) The Case where the Electric Motor M of the Working Actuator A Performs a Regenerative Operation When the electric motor M of the working actuator A performs a regenerative operation, the electric motor M operates as a generator to supply electric power to the DC bus La through the inverter I. Then, a voltage of the DC bus La increases because a charging current flows through the electrolytic capacitor 18 by the electric power supplied to the DC bus La through the inverter I.

When the voltage of the DC bus La increases, the control section 17 controls the step-up/down converter 16 so that the electrolytic capacitor 18 discharges and the voltage is reduced to a set value. Specifically, a gate open time of a step-down side transistor in the step-up/down converter 16 is controlled so as to supply electric power from the DC bus La to the capacitor 15 and charge the capacitor 15.

Then, regenerated electric power from the inverter I is stored in the capacitor 15 and an increase of the voltage of the DC bus La can be suppressed, so that the voltage of the DC bus La can be maintained at the set value.

In the case where a charging rate of the capacitor 15 becomes too high, the control section 17 limits a charging current of the capacitor 15 by the step-up/down converter 16 for preventing damage of the capacitor 15. Then, the voltage of the DC bus La cannot be maintained at the set value, so that the voltage of the DC bus La increases.

When the voltage of the DC bus La increases, there is a possibility that the electrolytic capacitor 18 or semiconductor elements and electrolytic capacitors in a converter and an inverter are damaged. Thus, a dynamic brake unit 19 (hereinafter, DBU 19) is provided on the DC bus La. The DBU 19 operates so as to flow a current to a resistor and reduce the voltage of the DC bus La before the voltage of the DC bus La becomes a hazardous voltage.

Accordingly, in the case where electric power generated by the regenerative operation of the electric motor M cannot be absorbed only by charging the capacitor 15, providing the DBU can prevent damage of respective equipment. Because of this, the regenerated operation of the electric motor M can be safely performed.

When the charging rate of the capacitor 15 drops, there is a possibility that the capacitor 15 cannot supply a difference between electric power required for operating the electric motor M at the time of power running and electric power supplied from the engine generator 11. Thus, in the case where the charging rate of the capacitor 15 drops, the control section 17 controls the step-up converter 13 to supply a current to the DC bus La and increase the voltage of the DC bus La. When the voltage of the DC bus La increases up to a predetermined set voltage, the control section 17 causes the step-up/down converter 16 to perform a step-down operation for suppressing the increase of the voltage of the DC bus La. Accordingly, electric power is supplied from the DC bus La to the capacitor 15. As a result, the capacitor 15 can be charged up to a proper charging rate.

Industrial Applicability

A hybrid power supply device of the present invention is suitable for a power supply of equipment supplying electric power to a DC bus of an inverter like a crane or the like having an engine generator as a power source such as a gantry crane or a tire-mounted jib crane.

BRIEF DESCRIPTION OF THE DRAWINGS

FIG. 1 is a schematic circuit diagram of a hybrid power supply device 10 of the embodiment.

Figure 2:
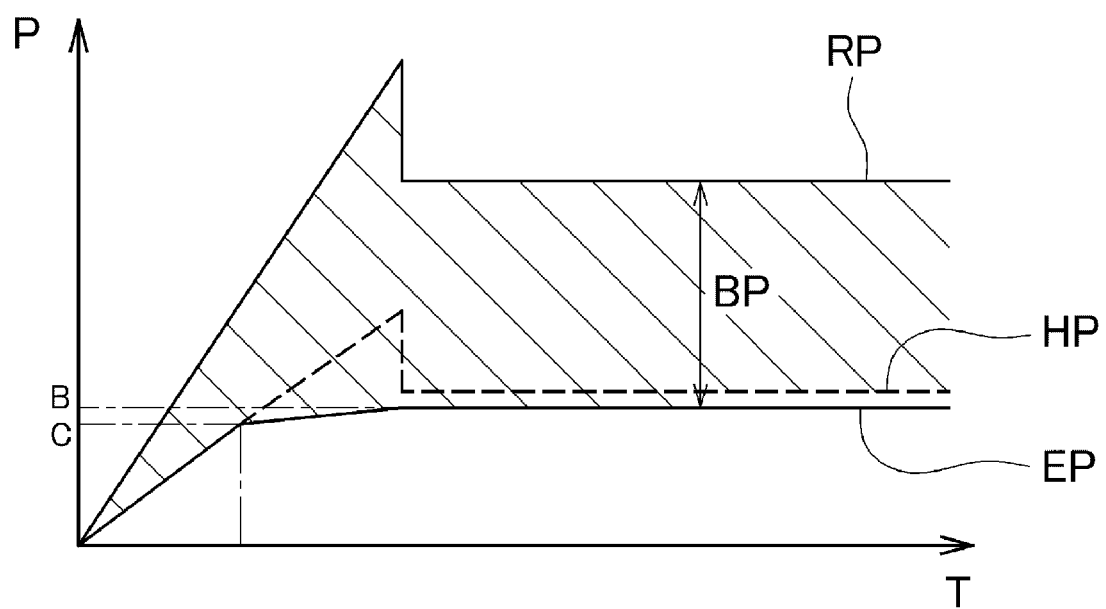
FIG. 2 is a diagram showing a variation state of a current amount borne by an engine generator 11 in the case where a current amount supplied to a working actuator A significantly increases.

| Description of Symbols | |
|---|---|
| 10 | hybrid power supply device |
| 11 | engine generator |
| 13 | step-up converter |
| 15 | capacitor |
| 16 | step-up/down converter |
| 17 | control section |
| 18 | electrolytic capacitor |
| A | working actuator |
| I | inverter |
| M | electric motor |

The invention claimed is:

1. A hybrid power supply device comprising an engine generator and a capacitor,
wherein that the device comprises:
a DC bus having the engine generator and the capacitor connected in parallel and supplying electric power to an outside;
a step-up converter provided between the DC bus and the engine generator and controlling a current amount supplied from the engine generator to the DC bus;
a step-up/down converter provided between the DC bus and the capacitor and controlling a voltage of the DC bus so as to be maintained at a predetermined set voltage; and
a control section controlling an operation of the step-up/down converter and the step-up converter, and
the control section controls the step-up converter so as to supply a part of a current amount supplied to the outside from the engine generator to the DC bus and controls the step-up/down converter so as to maintain the voltage of the DC bus at the predetermined set voltage higher than an output voltage of the engine generator,
wherein the engine generator has a supercharging mechanism, and
wherein the control section controls an increase rate of a current amount supplied from the engine generator to the voltage of the DC bus so that an increase rate of a current amount after exceeding a maximum current amount obtained at the time of a non-supercharging maximum power output in which the supercharging mechanism is not used in the engine generator is smaller than an increase rate of a current amount up to the maximum current amount obtained at the time of the non-supercharging maximum power output when the current amount supplied to the outside increases.

2. The hybrid power supply device according to claim 1, wherein the control section determines the current amount supplied from the engine generator to the DC bus based on the current amount supplied to the outside and an amount of charge of the capacitor.

3. The hybrid power supply device according to claim 1, wherein an electrolytic capacitor is connected to the DC bus in parallel with the engine generator and the capacitor.

4. A control method for a hybrid power supply device comprising an engine generator and a capacitor, wherein the device comprises:
- a DC bus having the engine generator and the capacitor connected in parallel and supplying electric power to an outside;
- a step-up converter provided between the DC bus and the engine generator and controlling a current amount supplied from the engine generator to the DC bus;
- a step-up/down converter provided between the DC bus and the capacitor and controlling a voltage of the DC bus so as to be maintained at a predetermined set voltage; and
- a control section controlling an operation of the step-up/down converter and the step-up converter, and the method comprises the step of: controlling the step-up converter by the control section so as to supply a part of a current amount supplied to the outside from the engine generator to the DC bus; and controlling the step-up/down converter by the control section so as to maintain the voltage of the DC bus at the predetermined set voltage higher than an output voltage of the engine generator, wherein the engine generator has a supercharging mechanism, and the method further comprises the step of: controlling an increase rate of a current amount supplied from the engine generator to the voltage of the DC bus so that an increase rate of a current amount after exceeding a maximum current amount obtained at the time of a non-supercharging maximum power output in which the supercharging mechanism is not used in the engine generator is smaller than an increase rate of a current amount up to the maximum current amount obtained at the time of the non-supercharging maximum power output when the current amount supplied to the outside increases.

5. The control method for a hybrid power supply device according to claim 4, wherein the method comprises the step of: determining the current amount supplied from the engine generator to the DC bus based on the current amount supplied to the outside and an amount of charge of the capacitor.

6. The hybrid power supply device according to claim 2, wherein an electrolytic capacitor is connected to the DC bus in parallel with the engine generator and the capacitor.

7. The hybrid power supply device according to claim 2, wherein the engine generator has a supercharging mechanism, and
the control section controls an increase rate of a current amount supplied from the engine generator to the voltage of the DC bus so that an increase rate of a current amount after exceeding a maximum current amount obtained at the time of a non-supercharging maximum power output in which the supercharging mechanism is not used in the engine generator is smaller than an increase rate of a current amount up to the maximum current amount obtained at the time of the non-supercharging maximum power output when the current amount supplied to the outside increases.

8. The control method for a hybrid power supply device according to claim 5, wherein the engine generator has a supercharging mechanism, and
the method comprises the step of: controlling an increase rate of a current amount supplied from the engine generator to the voltage of the DC bus so that an increase rate of a current amount after exceeding a maximum current amount obtained at the time of a non-supercharging maximum power output in which the supercharging mechanism is not used in the engine generator is smaller than an increase rate of a current amount up to the maximum current amount obtained at the time of the non-supercharging maximum power output when the current amount supplied to the outside increases.

* * * * *